INVENTORS
RALPH P. MUNDELL
SWAIN L. WOLLARD
BY Cameron, Kerkam + Sutton
ATTORNEYS

United States Patent Office 3,207,396
Patented Sept. 21, 1965

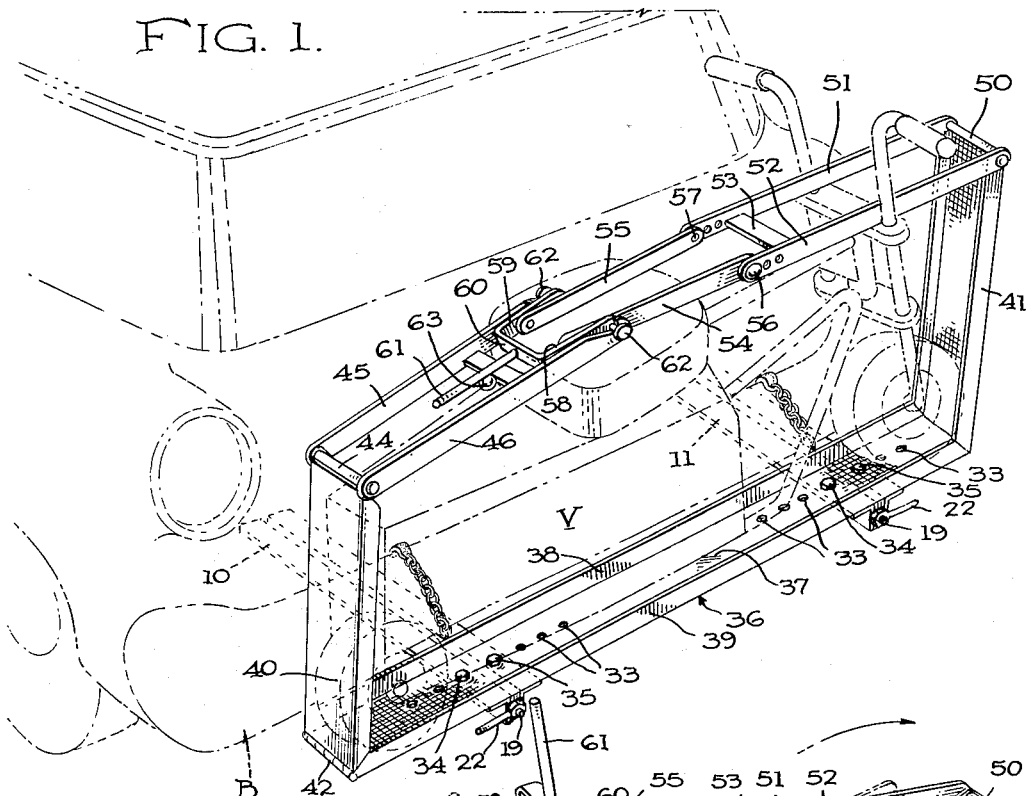
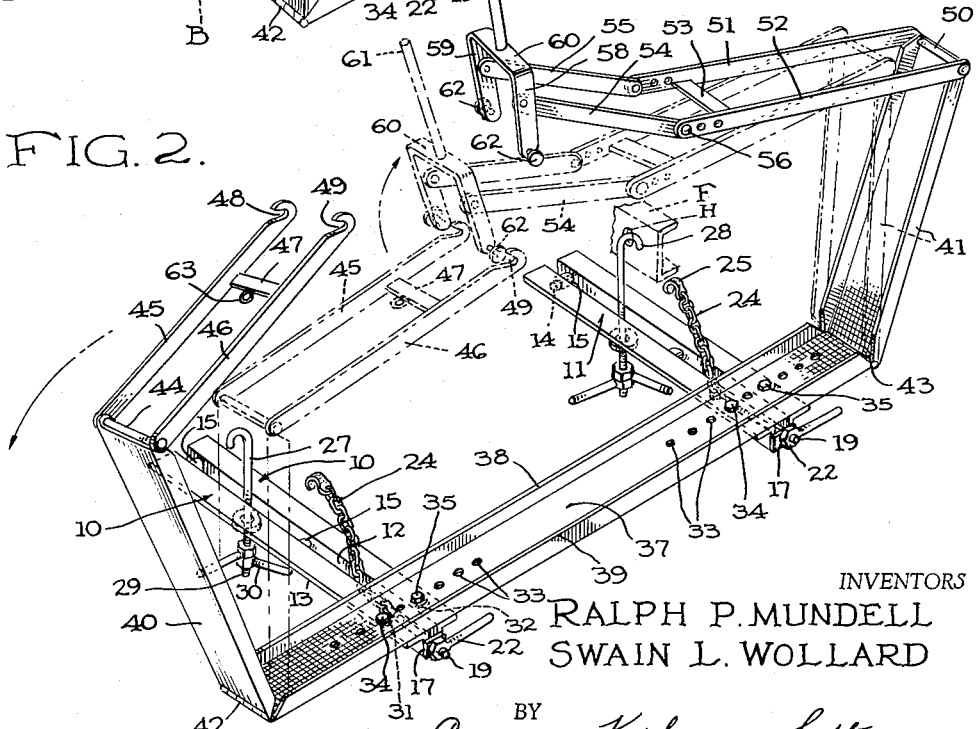

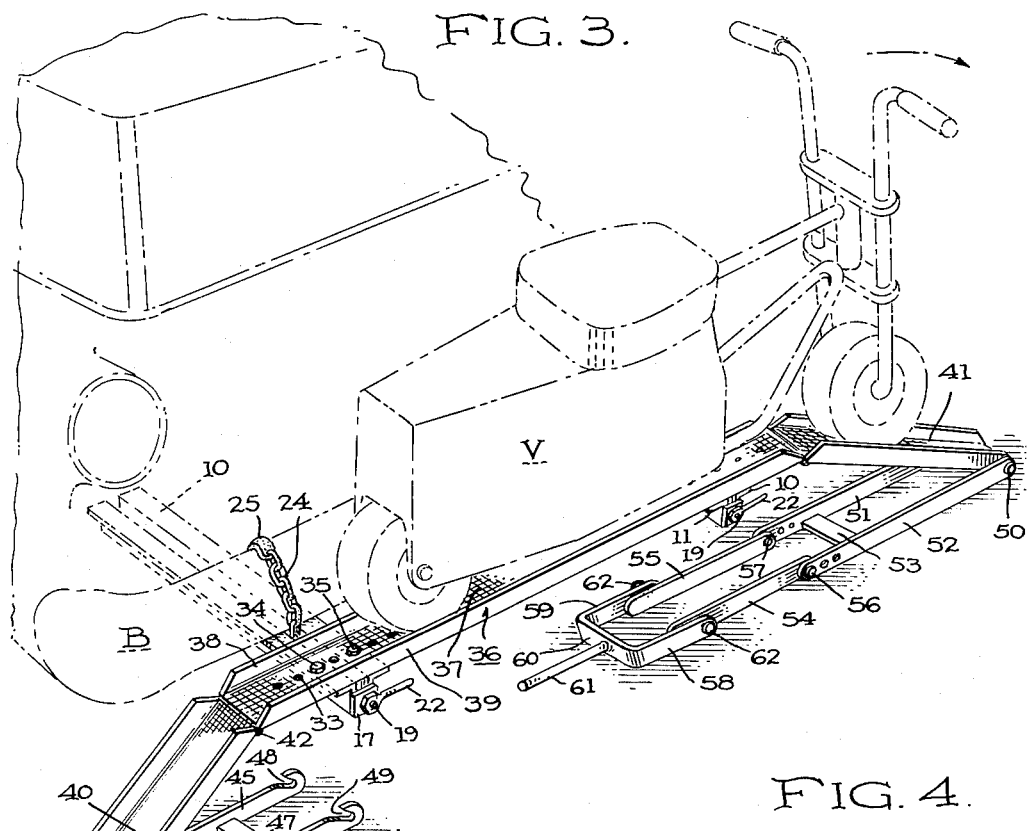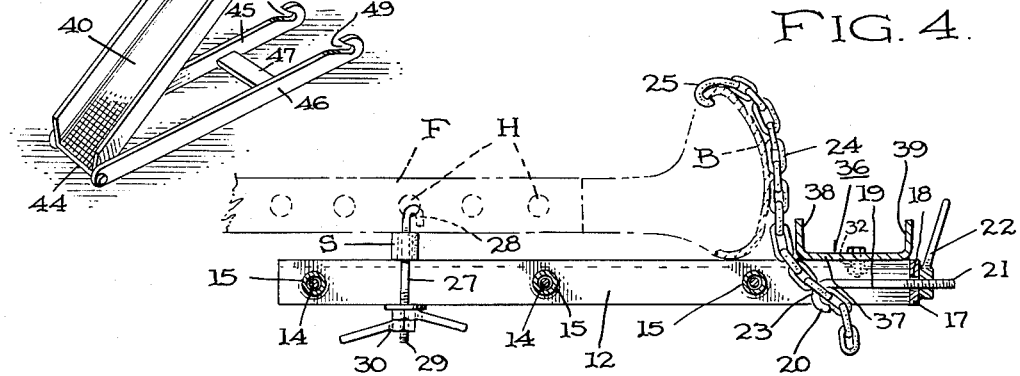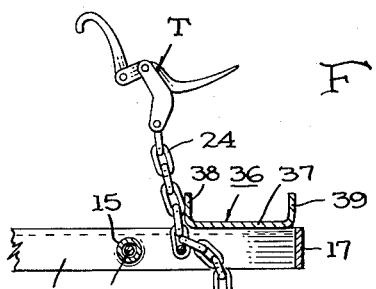

3,207,396
READILY ATTACHABLE CARRIER STRUCTURE
AND TRAILER HITCH FOR VEHICLES
Ralph P. Mundell and Swain L. Wollard, both of Fairmont, W. Va., assignors to Mid-Eastern Enterprises, Inc., Fairmont, W. Va., a corporation of West Virginia
Filed Apr. 21, 1964, Ser. No. 361,353
7 Claims. (Cl. 224—42.03)

This invention relates to improved carrier means for attachment to the main frame beams and bumper of automobiles or trailers designed to transport small, two-wheeled vehicles and which may be modified for use as a trailer hitch.

The mounting frame structure is so designed that it may be attached readily and rapidly to the main frame under the vehicle and to the bumper thereof and may as readily be removed therefrom.

Structures of this type in the past have normally been clamped, bolted or otherwise affixed to the bumper of the vehicle and have had limitations of weakness, insecurity and difficulty of mounting to the bumper. Further, the bumpers of modern automobiles are of reduced size and close tolerance, particularly at their upper edges, which makes it difficult to obtain a satisfactory mounting of the carrier structure or trailer hitch thereon.

It is therefore a primary object of this invention to provide mounting means for small two-wheeled vehicles or trailer hitches which may be rapidly and easily affixed to the under frame and bumper of a vehicle without any specialized tools and which is of superior strength and capable of supporting heavy loads without applying undue stress to the bumper of the vehicle.

It is a further object of this invention to provide such a mounting structure which is readily adaptable to vehicles of widely divergent sizes and which may be readily adjusted to fit any vehicle, regardless of its size.

It is a further object to provide an improved carrier for small two-wheeled vehicles which may be opened to form end ramps for the loading and unloading of such vehicles and which will provide a strong and positive support therefor at the bumper extremity of the vehicle for safe and secure transportation of the vehicle.

It is a further object of this invention to provide an improved trailer hitch mount for vehicles which may be quickly affixed thereto or removed therefrom and which will be of superior strength and capable of supporting heavy loads.

Other and further objects of this invention will become apparent as this specification proceeds.

Referring to the drawings,

FIG. 1 is a perspective view of an improved carrier and support means for small, two-wheeled vehicles, partially in phantom, in "closed" position on a vehicle;

FIG. 2 is a perspective view, partially in phantom, of the improved carrier and its attaching structure, in two stages of opening;

FIG. 3 is a perspective view of the carrier in fully "opened" position with its end channels turned downwardly into contact with the ground to provide loading or unloading ramps for a vehicle carried thereby;

FIG. 4 is a fragmentary, longitudinal cross-sectional view of the outer extremity of one of the supporting beam structures for the carrier, showing the bumper hook and chain adjustable by a J-bolt mounted in the extremity of the beam and vetical J-bolt supporting the beam to the vehicle frame;

FIG. 5 is a fragmentary, detailed view of an alternative embodiment of the bumper hook structure;

Figure 6:
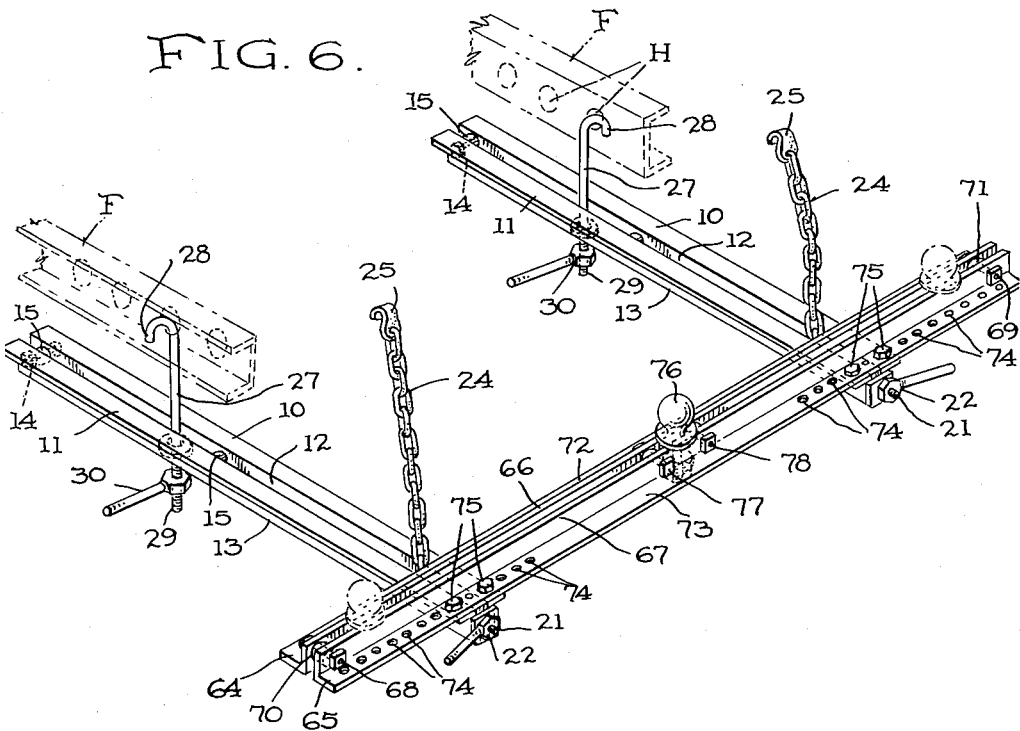
FIG. 6 is a perspective view of an alternative embodiment of the invention, partially in phantom, in which lateral beam means are provided mounted across the rear extremities of the under beams, carrying a ball-type trailer hitch for the attachment of a trailer.
Figure 7:
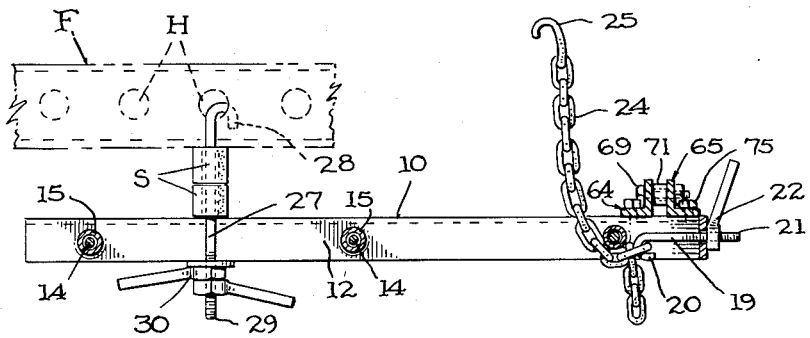
FIG. 7 is a fragmentary, detailed view of the attaching means for the embodiment shown in FIG. 6.

In the drawings, 10 and 11 designate the main supporting beams for the carrier or trailer hitch structure. Beams 10 and 11 are designed to fit closely under the main frame beams of the vehicle and preferably to bear closely thereagainst to provide an exceptionally strong, self-braced support for the rear structure transporting the load. Beams 10 and 11 are preferably formed from 1½" structural steel angles which are joined at their vertical, parallel faces 12 and 13 by means of a series of bolts 14 and spacers 15 disposed between vertical faces 12 and 13 thereof to space the vertical walls 12 and 13 at a distance of approximately 1" apart for the length of the beams to provide a longitudinal space therebetween for a purpose hereinafter to be discussed.

Bolts 14 are preferably headed at one extremity and provided with nuts at their opposite extremity and are passed through appropriate aligned bores 16 provided in the parallel, opposed vertical walls 12 and 13 of the beam segments. Spacers 15 are preferably in the form of cylindrical sleeves fitted over the interior sections of bolts 14 and bearing at each extremity against inner walls 12 and 13 of the angle beam segments.

As beams 10 and 11 are identical in structure the details of only one of said beams will be described, like parts of each being designated by like numerals.

At their rear extremities vertical walls 12 and 13 of beams 10 and 11 are provided with rectangular end plates 17, which are preferably welded thereover. End plates 17 are preferably bored at their centers at 18 to slidably receive J-bolts 19. J-bolts 19 are preferably elongate, as shown, and fit freely in the longitudinal space between vertical walls 12 and 13 of beams 10 and 11. They are provided at their inner extremities with bent down or hook portions 20 and at their outer extremities are screw-threaded at 21 to receive terminally screw-threaded adjusting levers 22, which, upon clockwise rotation, will shorten J-hooks 19 through the bores 18 of terminal plates 17.

As shown in FIG. 4, the hook extremities 20 of J-bolts 19 may be selectively registered in an appropriate link 23 of chain 24, the extremity of which is provided with a bumper hook 25 designed to be affixed over the upper flange of the bumper B of the vehicle to support the beam structure thereon at its rear extremity. Referring to FIG. 4, it will be seen that chain 24 may be appropriately adjusted in length over the bumper B of the vehicle by applying the hook 25 over the upper edge of the bumper and by pulling chain 24 tight and applying the appropriate link 23 thereof over the hook extremity 20 of J-bolt 19. Chain 24 may then be tightened down fully by turning adjusting lever 22 in a clockwise direction to pull J-hook 19 rearwardly through end plate 17 until the required tension has been applied to chain 24.

Beams 10 and 11 are preferably closely affixed under the main frame beams F of the vehicle, which are provided with appropriate line holes or bores H, by means of vertically disposed J-bolts 27 provided with turned-over or hook sections 28 at their upper extremities and with screw threads 29 at their lower extremities, beneath beams 10–11. Adjusting levers 30, provided with heads carrying internal, mating screw threads are applied over the threads 29 at the lower extremities of J-bolts 27 to tighten them in position after hooks 28 have been appropriately inserted through the holes H in the main frame beams F of the vehicle. As shown, a washer may be applied over the lower extremity of J-bolt 27, bearing against the under surface of the support beam 10 or 11, between it and the head of adjusting lever 30.

Due to the spacing between the vertical walls 12 and 13 of beams 10 and 11, J-bolts 27 may be slid forwardly or rearwardly in said spacing until their upper hook extremities 28 are in registration with one of the holes H in the frame beam F of the vehicle. With hook 28 appropriately seated through a hole H in the frame beam F, lever 30 is then turned in a clockwise direction to tighten J-bolts 27 to a desired degree to maintain beams 10 and 11 closely in engagement under the main frame beams F of the vehicle. It may be necessary in some instances to provide spacers S about the shanks of J-bolts 27 between beams 10–11 and frame beams F to maintain beams 10 and 11 in proper horizontal position and parallel under the frame beams F of the vehicle. By virtue of the close alignment of beams 10 and 11 under the undersurfaces of the frame beams of the vehicle, beams 10 and 11 are "braced" against the frame beams, "fulcrums" being provided by J-bolts 27, and thus an extremely strong and rigid union is provided. Beams 10 and 11 thus become to all intents and purposes "part" of the frame beams and a structure of great strength results.

At their rear extremities, the upper, horizontal surfaces of beams 10 and 11 are preferably provided with spaced bores 31 and 32 which may be appropriately registered with aligned, correspondingly spaced bores 33 provided in the extremities of the base channel member of the supporting structure. Bolts 34 and 35 are provided, passed through the respective bores in the upper surfaces of beams 10 and 11 and the spaced bores 33 in the extremities of the base channel of the carrier, as will hereinafter be discussed at more length.

Referring specifically to the convertible carrier structure per se, which is supported on the rear extremities of beams 10 and 11, rearwardly of the bumper of the vehicle, it will be seen that the carrier channel 36 preferably comprises a base plate 37 and integral, rectangular channel walls 38 and 39, the channel being preferably on the order of 4½" in width and the upstanding walls thereof on the order of 1¼" in height. The preferred length of the base channel 36 is preferably on the order of 57". These dimensions may be widely varied depending on the type and size of the vehicle V or other load to be supported. As previously indicated, base plate 37 of carrier channel 36 is preferably provided with a series of spaced bores 33 at its extremities, spaced to register with the corresponding bores 31 and 32 in the upper, rear surfaces of beams 10 and 11 whereby it may be appropriately fitted and bolted to beams 10 and 11 regardless of the width of the vehicle to which the structure is applied.

The surface of plate 37 is preferably checkered or etched to provide firm support for the tires of the vehicles supported thereby.

At its lateral extremities, base channel 36 is preferably provided with hingedly mounted end channel plates 40 and 41 which are hingedly attached to the extremities of channel 36 by means of hinges 42 and 43, respectively, made integral therewith. Hinged end channels 40 and 41 are preferably of the same width as base channel 36 and are provided with similar rectangular walls. Channels 40 and 41 are preferably on the order of 26" in length, although their length may be varied depending upon the height of the vehicle to be transported. It will be noted that the extremities of walls 38 and 39 of channel 36 are preferably cut back at an angle of 45° to register with the similarly cut back lower extremities of the walls of end channels 40 and 41 whereby when end channels 40 and 41 are raised to their fullest extent these cut back extremities will register and maintain end channels 40 and 41 at 90° angles to base channel 36.

The upper frame structure of the carrier will now be described. Pivotally affixed to the upper extremity of end plate 40 as by means of pivot rod 44 are paired parallel bars 45 and 46 which are fixedly joined together adjacent their inner extremities by means of brace bar 47, which is welded or otherwise appropriately affixed therebetween to maintain bars 45 and 46 in fixed, parallel relationship as a unit. At their inner extremities, bars 45 and 46 are preferably provided with hooks or cut-backs 48 and 49, for a purpose hereinafter to be discussed in more detail.

Pivotally affixed at the upper extremity of end channel 41, as by means of pivot rod 50, are bars 51 and 52 which are preferably united at their inner extremities by cross bars 53 welded therebetween to maintain bars 51 and 52 in fixed, parallel relation as a unit. At the inner extremities of bars 51 and 52 link bars 54 and 55 are pivotally affixed by means of pivot bolts 56 and 57 passed through registering bores in the extremities of bars 51 and 52 and links 55 and 54, respectively.

At their inner extremities, link bars 54 and 55 are preferably pivotally affixed just above the centers of the parallel side arms 58 and 59 of toggle clamp 60. As shown, toggle 60 is preferably of inverted U-shaped configuration and is provided at its upper extremity with handle or lever 61 which extends vertically therefrom. Arms 58 and 59 of toggle 60 are provided at their lower, outer extremities with headed studs 62 extending at right angles thereto and which register in cut-backs 48 and 49 in the upper surfaces of the extremities of paired bars 45 and 46, for a purpose hereinafter to be discussed in more detail.

It will thus be seen that when headed studs 62 are seated in cut-backs 48 and 49 in the extremities of bars 45 and 46 downward pressure against lever 61 of toggle 60 will take up on and tighten the entire upper frame and linkage structure through bars 51–52, links 54–55 and bars 45–46 and that when toggle 60 is in horizontal position against brace bar 47 of bars 45 and 46 the entire structure will be in tight, clamped condition over the load.

A padlock loop 63 may be provided on bar 47, as shown, to enable the locking of toggle lever 61 thereagainst, to prevent opening of the structure.

It will thus be seen that while base channel 36 is immovably bolted over the rear extremities of beams 10 and 11, the balance of the carrier structure, including end channels 40 and 41 and the upper bar structure 51–52, links 54–55, toggle 60 and bars 45–46 are all pivotally connected in interrelation with each other whereby the entire end channel and bar and toggle structures may be collapsed outwardly and downwardly, end channels 40 and 41 contacting the ground and thus providing ramp structures for the loading of a vehicle V, as shown in FIG. 3. This aspect of the invention will be discussed more fully later in this specification.

Referring now to the alternative embodiment of the invention in which the lateral beam means affixed across the extremities of beams 10 and 11 is in the form of a trailer hitch, preferably of the ball type, the balance of the supporting beam structure, i.e., including beams 10 and 11 and their attendant attaching structure being identical to that previously discussed.

In this embodiment of the invention brace beams 10 and 11 are affixed to the frame beams of the vehicle by means of J-bolts 27 and to the bumper thereof by chains 24, hooks 25 and J-bolts 19, shortened by means of cranks 22. The salient difference between this embodiment and the vehicle carrier embodiment previously described lies in the lateral beam structure which supports a ball type trailer hitch at its center, or which may, in the case of a single wheel trailer, support two such ball type trailer hitches at its extremities, as shown in dotted lines in FIG. 6. This lateral beam structure is preferably formed in the same manner as supporting beams 10 and 11, i.e., of two equal lengths of 1½" steel angle appropriately bolted together with bolts and spacers, but in reverse position with its flattened surface disposed downwardly and bolted flush on the horizontal, upper rear surfaces of beams 10 and 11, as shown in FIG. 6. This lateral beam member, supporting the trailer hitch ball or balls, is composed of two steel angles 64 and 65 whose vertical walls 66 and 67 are preferably joined at their extremities by bolts 68 and 69. Appropriate spacers 70 and 71 are provided on bolts 68 and 69, between vertical walls 66 and 67 of beam sections 64 and 65 to maintain them in spaced, parallel relationship, approximately one inch apart.

As shown, the horizontal surfaces 72 and 73 of beam sections 64 and 65 are preferably provided at each extremity with aligned bores 74 so spaced as to register with corresponding bores in the horizontal surfaces of the rear, upper extremities of beams 10 and 11, bolts 75 being provided to maintain the lateral beam structure in position on the upper, rear surfaces of beams 10 and 11. This arrangement of aligned holes in beams 10 and 11 and in beam sections 64 and 65 permits ready attachment of the structure to any vehicle, regardless of the distance between its frame beams.

Ball 76 of the trailer hitch is preferably centrally mounted between vertical walls 66 and 67 by means of appropriate bolts 77 and 78 and is preferably provided with a screw-threaded shank extending downwardly between beam sections 66 and 67, a large washer and nut being provided thereover to maintain the ball joint in position thereon.

As aforesaid, by virtue of the provision of spaced bores 74 in the lateral extremities of horizontal surfaces 72 and 73 of the lateral beam and the provision of corresponding bores in the upper, rear surfaces of beams 10 and 11 the structure is readily adaptable to vehicles of widely varying widths.

Referring now to the first embodiment of the invention described, in which a support or carrier for small two-wheeled vehicles of the "motor-scooter" type is shown, with the carrier appropriately affixed to the vehicle frame by means of J-bolts 27 and to its bumper by means of chains 24 and hooks 25, when it is desired to load a vehicle, toggle 60 is released and thrown to the right, thus freeing bars 45–46 from toggle studs 62. Links 54–55 and bars 51–52 are then swung outwardly on pivots 44 and 50 and end channels 40 and 41 are also swung outwardly on hinges 42 and 43, bars 45–46 being swung under end channel 40 and the opposed toggle, linkage and bar structure being swung under the opposite end channel 41, as shown in FIG. 3 of the drawings. It will thus be seen that end channels 40 and 41 swing downwardly to rest against the surface of the ground and thus provide acutely-angled ramps up which a two-wheeled vehicle may be moved under its own power into position on channel 36. With the vehicle thus in position on channel 36 the reverse of the foregoing procedure is followed, end plate 40 being swung upwardly into vertical position and pivoted bars 45–46 being passed over the upper surface and seat of the vehicle. Opposite end plate 41 is then swung to vertical position and bars 51–52, links 54–55 and toggle 60 are lowered into horizontal position over the vehicle, bars 51–52 fitting between the handle bar uprights thereof, as shown in FIG. 1. Toggle studs 62 are then inserted into hooks 48 and 49 at the extremities of bars 45–46 and toggle lever 61 is then forced downwardly to lock the upper, pivoted bar and link structure over the seat of the vehicle, as shown in FIG. 1 of the drawing. An appropriate padlock or other locking means may then be applied through the hasp on brace bar 47 of bars 45–46 about lever 61 of the toggle assembly, to maintain the structure in locked position over the vehicle, for transport.

In moving the vehicle from the carrier, the reverse of this operation is followed, the lock being removed and the toggle lever 61 being thrown to the right to free the upper bar and link assemblies, which are then swung outwardly and downwardly, respectively, beneath end channels 40 and 41, which are swung outwardly and downwardly into contact with the surface of the ground. The vehicle may then be unloaded under its own power down either ramp provided by the end channels 40 and 41.

When the carrier is not being used for transporting a load it may be readily removed from the vehicle by loosening chains 24 and J-hooks 27 to remove the entire structure from the vehicle.

If it is not desired to remove the carrier from the vehicle it is merely closed, as previously described, by swinging end plates 40 and 41 to vertical position and by locking the extremities of bars 45–46 and links 54–55 by means of toggle 60.

It will be noted from FIG. 1 that the vehicle is preferably positioned on channel 36 with its front wheel bearing against end channel 41 whereby bars 51–52 pass between the vertical handle bars of the vehicle, links 54–55 and toggle 60 being brought downwardly over the seat of the vehicle to register with bars 45–46, as shown in FIG. 1, whereby the pivoted bar and linkage structure 45–46 and 54–55 may angularly adjust over the cushion of the seat structure of the vehicle, bearing downwardly thereon and thus holding the vehicle firmly in position when toggle 60 is thrown downwardly. The front wheel of the vehicle bears against end channel 41 and the rear wheel bears against end channel 40. Appropriate longitudinal adjusting means may be provided between the extremities of links 54–55 and the inner extremities of bars 51–52 whereby the length of this section of the structure may be adjusted to adapt to vehicles of varying heights and lengths. As shown in FIGS. 1 and 2, this structure normally takes the form of a series of aligned bores in the inner extremities of bars 51 and 52 to selectively receive studs 56 and 57, pivotally joining the extremities of bars 51–52 and links 54–55.

Obviously, if desired, the position of the vehicle on channel 36 may be reversed, its front wheel then bearing against end channel 40.

The invention is susceptible of numerous embodiments without departing from the spirit thereof.

Thus, referring to FIG. 5, in place of the chain hooks and the J-bolt structure, including the take-up levers 22, the lower extremities of chains 24 may be adjustably mounted on removable bolts passed through the rear extremities of beams 10 and 11 and toggle hooks T may be provided at the upper extremities of chains 24 for affixing these extremities to the upper edges of the bumper. Other mechanical equivalents may be substituted for this structure within the spirit of the invention.

Further, solid or skeletal pivoted plates could be substituted for the top bar structure of the carrier embodiment of the invention, appropriate linkage and toggle means being provided at their centers for tightening and locking the entire assembly over a vehicle in position on the base channel thereof.

Throughout the combination, mechanical equivalents may be substituted for the elements thereof, without departing from the spirit of this invention.

Attention is directed to the appended claims for a limitation of the scope of the invention.

What is claimed is:

1. In a load supporting means for vehicles, parallel beams extending inwardly beneath said vehicle aligned under and bearing against the frame beams of the vehicle, hook means adjustably disposed through said parallel beams registering in said frame beams and maintaining said parallel beams in position beneath said frame beams, hook means adjustably affixed at the rear extremities of said beams affixed over the upper edge of the bumper of the vehicle, load supporting means disposed laterally across the rear extremities of said beams and means on said load supporting means for affixing a load thereto.

2. In a load supporting means for vehicles, spaced, paired beams extending inwardly under the vehicle aligned under the frame beams thereof, hook means adjustably mounted through said paired beams registering in the frame beams of the vehicle, flexible line means adjustably affixed at the rear extremities of said paired beams, hook means at the upper extremities of said line means engaging the upper edge of the bumper of the vehicle, support means laterally affixed across the rear extremities of said paired beams rearwardly of said vehicle, end plates hingedly affixed at the extremities of said support means and normally extending vertically therefrom, bar means pivotally affixed at the upper extremities of said end plates, link and toggle means at the inner extremity of one of said bar means removably engaging the extremity of the other of said bar means whereby said structure may be erected in the form of a rectangular casing about a load supported on said support means.

3. In a load supporting structure for vehicles, paired beams extending under said vehicle in parallel relationship aligned under the frame beams of said vehicle, hook means vertically disposed through said paired beams affixing at their upper extremities in the frame beams of said vehicle, hook means at the rear extremities of said paired beams attaching over the bumper of the vehicle, a channel disposed laterally across the rear extremities of said paired beams and extending outwardly therefrom, end channels hingedly affixed at the extremities of said channel capable of angular movement through an arc of at least 120° with respect thereto, bar means pivotally affixed at the upper extremities of said end channels, toggle means pivotally mounted at the inner extremity of one of said bar means and removably engaging the extremity of the other of said bar means whereby the structure may be erected into a rectangular frame supporting a load and may be swung outwardly and downwardly to form angular ramps at the extremities of said channel.

4. In a load supporting structure for attachment to the underframe and bumper of a vehicle, parallel, inwardly extending dual beams spaced apart along their median lines, J-bolts disposed upwardly through the center space in said beams and longitudinally movable therein for registration in the frame beams of the vehicle, means at the lower extremities of said J-bolts beneath said beams actuatable to tighten said bolts, chain means at the rear extremities of said beams, screw adjustable means in the ends of said beams attached to said chains and adjustable to shorten said chains, hook means at the upper extremities of said chains fitting over the bumper of said vehicle, a lateral channel beam mounted across the rear extremities of said beams rearwardly of said vehicle, end plates hingedly affixed at the extremities of said lateral channel movable through an arc of some 120° with respect thereto from the vertical, parallel, paired bars pivotally affixed at the extremities of said end plates, link and toggle means pivotally mounted at the inner extremities of one of said paired sets of bars engaging at their inner extremities the ends of the opposed set of paired bars whereby the assembly may be erected into a rectangular carrying compartment for a two-wheeled vehicle and may be opened to form end loading ramps for said lateral channel.

5. In a readily removable load supporting structure designed to be attached to the underframe and bumper of a vehicle, spaced parallel beams extending inwardly beneath said vehicle aligned under the frame beams thereof, hook means disposed upwardly through said beams engaging the frame beams of said vehicle at their upper extremities, screw-adjustable lever means at the lower extremities of said hook means beneath said beams acting to shorten said hook means, flexible tension means affixed at the outer extremities of said beams, hook means at the upper extremities of said flexible tension means fitting over the upper edge of the bumper of the vehicle, means rotatably mounted in the rear extremities of said beams connected to said flexible tension means and adjustable to tighten said flexible tension means when said hooks are in position over the upper edge of the bumper of the vehicle, a channel-shaped base plate laterally affixed across the rear extremities of said beams at right angles thereto, end channel plates hingedly affixed to the extremities of said base channel and normally extending upwardly from the ends thereof at right angles, paired bar means pivotally affixed at the extremities of said end channel plates normally extending inwardly therefrom when said end channel plates are in vertical position, link and toggle means pivotally affixed at the inner extremity of one of said set of paired bars and removably affixing to the extremities of the other of said set of paired bars whereby when said end channel plates are raised into vertical position and the extremities of said paired bars are joined a rigid carrier for a two-wheeled vehicle is provided adjacent the bumper of the vehicle.

6. In a load supporting means for a vehicle, parallel, paired beams extending inwardly beneath the vehicle bearing against the frame beams of the vehicle, hook means vertically disposed through the longitudinal spaces in said paired beams registering in said frame beams and maintaining said paired beams in close, bearing relation beneath said frame beams, hook means adjustably affixed at the rear extremities of said paired beams affixed over the upper edge of the bumper of the vehicle, a beam laterally affixed across the rear extremities of said paired beams rearwardly of said vehicle, ball means for a trailer hitch affixed to and extending upwardly from said beam.

7. In a load supporting means for a vehicle, parallel, paired beams extending inwardly beneath the vehicle bearing against the frame beams of the vehicle, hook means vertically disposed through the longitudinal spaces in said paired beams registering in said frame beams and maintaining said paired beams in close, bearing relation beneath said frame beams, means at the lower extremities of said hook means beneath said paired beams movable to tighten said hook means in said frame beams, hook means adjustably affixed at the rear extremities of said paired beams affixed over the upper edge of the bumper of the vehicle, a beam laterally affixed across the rear extremities of said paired beams rearwardly of said vehicle, ball means for a trailer hitch affixed to and extending upwardly from said beam.

References Cited by the Examiner

UNITED STATES PATENTS

| 2,552,977 | 5/51 | Klotz. | |
|---|---|---|---|
| 2,646,289 | 7/53 | Smith | 280—501 |
| 3,039,634 | 6/62 | Hobson et al. | 224—42.03 |

FOREIGN PATENTS

| 104,714 | 6/42 | Sweden. |
|---|---|---|

HUGO O. SCHULZ, *Primary Examiner.*